Nov. 23, 1937.  C. R. EDWARDS  2,099,955
FLUID TRANSMISSION SCALE
Original Filed Oct. 2, 1922  4 Sheets—Sheet 1

Inventor
CHARLES R. EDWARDS
By Jesse R Stone
Lester B Clark
Attorneys.

Nov. 23, 1937.　　　　C. R. EDWARDS　　　　2,099,955
FLUID TRANSMISSION SCALE
Original Filed Oct. 2, 1922　　4 Sheets—Sheet 2

Inventor
CHARLES R. EDWARDS
By Jesse R. Stone
Lester B. Clarke
Attorneys.

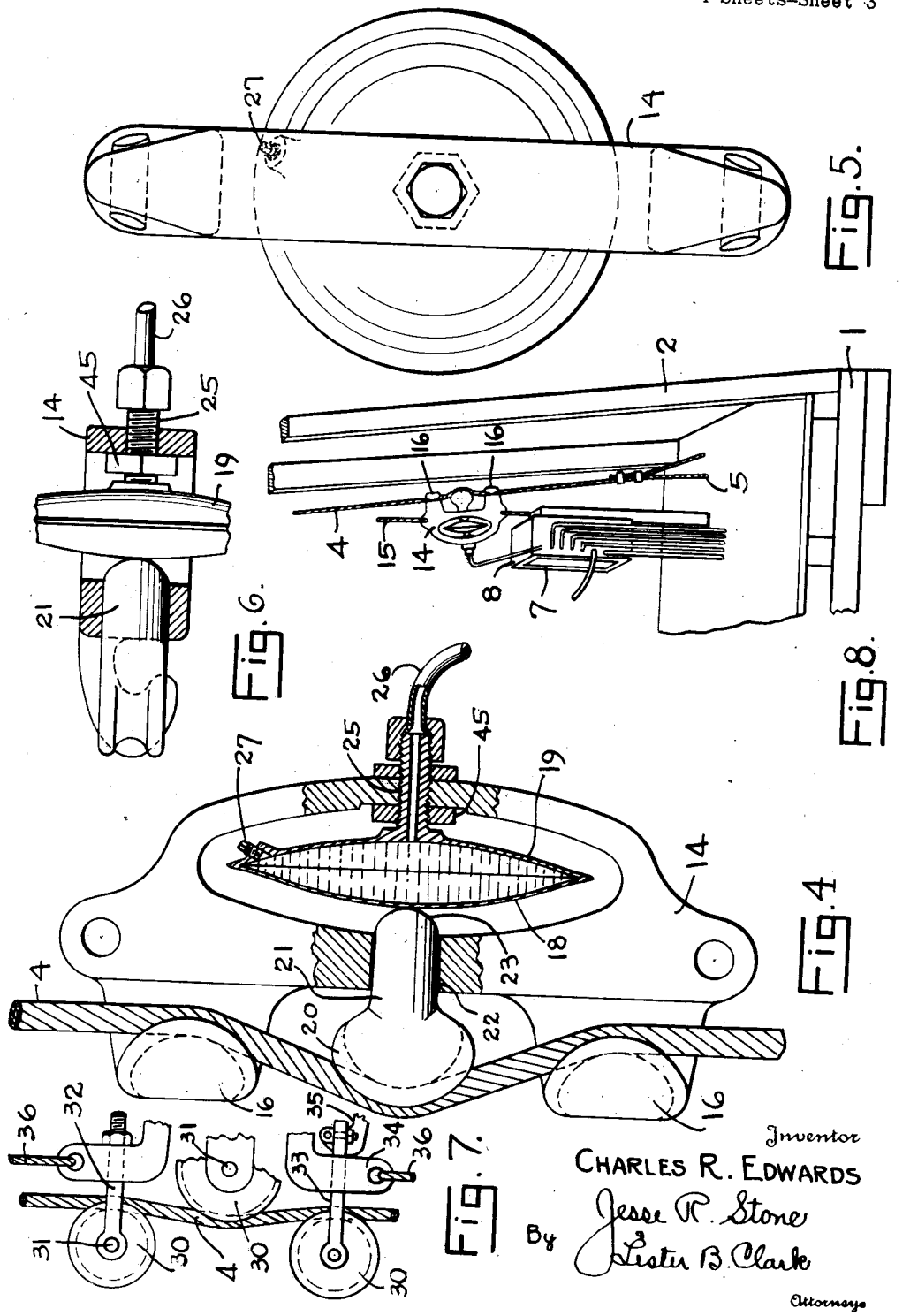

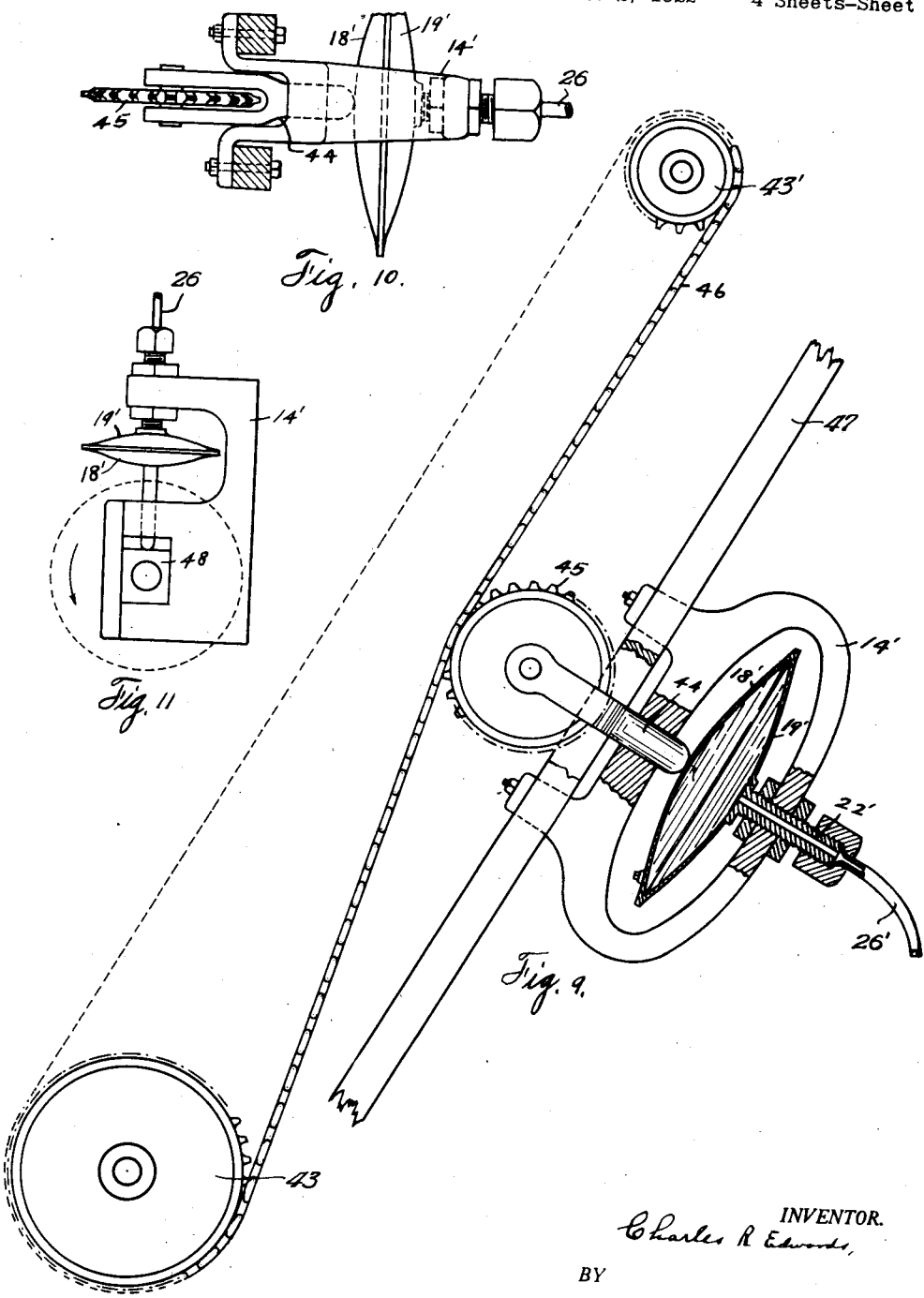

Patented Nov. 23, 1937

2,099,955

UNITED STATES PATENT OFFICE 2,099,955

FLUID TRANSMISSION SCALE

Charles R. Edwards, Houston, Tex.

Original application October 2, 1922, Serial No. 591,755. Divided and this application September 8, 1934, Serial No. 743,290

2 Claims. (Cl. 265—1.6)

The invention relates to new and useful improvements in a record-making apparatus for well drilling operations.

One object of the invention is to provide an apparatus of the character described whereby a record may be made of the various operations incident to well drilling by the rotary process, and a complete log of the well thus provided.

In operations attending the manipulations of devices suspended in a well, such, for example, as well drilling, and fishing for parts to be removed from the well, it is very important that a record be made of the essential operations in connection with the processes being performed so that when the work is completed a permanent and complete log of the operations will be preserved. The present invention has been designed for the making of such a record, and is a division of my prior co-pending parent application, Serial No. 591,755, filed October 2, 1922 for a Record making apparatus for drilling operations. The present invention is directed to one part of the invention in the parent case; relating to a weight recorder and indicator whereby the weight on the medium used to suspend and manipulate parts in the well, as on one of the lines used in supporting or moving, say the drill stem for example, may be measured as an indication of the weight which is being carried by the support above ground, as by the derrick, as distinguished from the weight which is resting upon the drill bit and the formation supporting the drill bit.

It is one of the objects of the invention to provide an apparatus of the character described which is of comparatively simple construction, may be cheaply and easily manufactured, and which will be accurate in use, and which will form a convenient attachment for a conventional rig.

It is one of the objects of the invention to provide a weight indicator so that the operator may be apprised of the weight which is being suspended in the derrick, or the weight which is applied to the drill bit, depending upon the calibration of the device and its adjustments.

Another object of the invention is to provide a device wherein a flexible member, such as a cable, is deflected so that any change in tension on the cable will tend to change the deflection, and in this manner indicate the amount of tension on the cable and associated parts, or change in tension.

Another object is to indicate and record the weight of the suspended manipulatable parts in a well bore or the downward pull of such parts on the suspending and manipulating means.

Another object of the invention is to provide certain novel features of construction, operation and arrangement of parts, an example of which is given in the specification and illustrated in the accompanying drawings wherein:

Fig. 4 is a side elevation, partly in section, of one form of the cable tension register illustrating the construction thereof.

Fig. 5 is a side view of the cable tension register taken at right angles to Fig. 4.

Fig. 6 is a horizontal sectional view through the frame of the cable tension register, but illustrating the finger and diaphragm housing in plan view.

Fig. 7 shows a modified form of the cable tension register which may be used when the cable is to be moved through the register.

Fig. 8 shows a broken elevation of the structure wherein the cable tension register may be mounted on the dead line near the derrick floor with the recorder case adjacent thereto.

Fig. 9 shows a modified form of the cable tension register similar to that shown in Fig. 7, but in which the device is shown as a chain tension register.

Fig. 10 shows a fragmentary side view of the embodiment shown in Fig. 9.

Fig. 11 shows a fragmentary sectional view of a bearing tension register embodying the invention.

Figure 1:
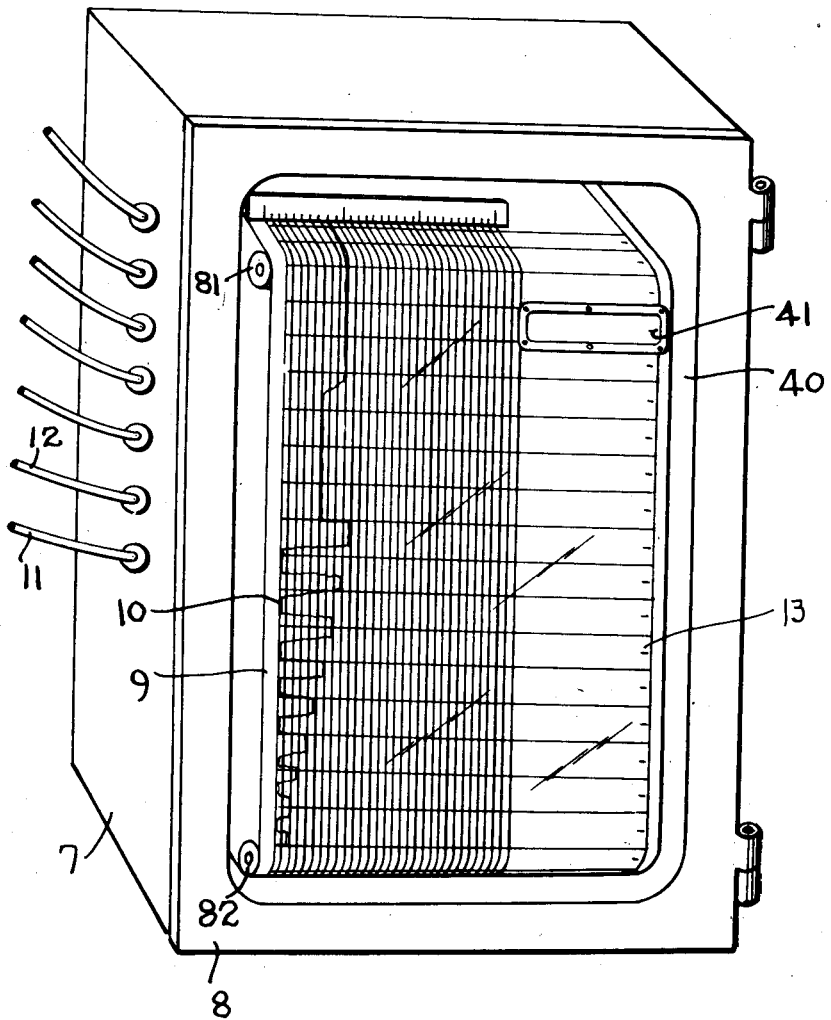
Fig. 1 is a front view of the casing containing the recording apparatus employed.

Referring now more particularly to the drawings wherein like numerals of reference designate similar parts in each of the figures, the numeral 1 designates the derrick foundation on which the rotary table, not shown, for performing the drilling operation is mounted and driven in the usual manner. The derrick structure is shown by the reference numeral 2 and is broken away in Fig. 8 to illustrate the arrangement and location of the present invention.

As is well understood in drilling operations, the drill stem is suspended by a suitable traveling block, crown block and cable connection, so that the drill stem may be raised and lowered during the drilling operation. One form of the present invention contemplates that the recorder or indicator will be attached, as seen in Fig. 8, to the end 4 of the hoisting cable which is anchored at 5 to the derrick foundation. This end is known as the dead end or dead line of the hoisting cable, because the end does not move. It seems obvious that any strain upon this dead end 4 is proportional to the strain on the cable and this strain is an indication of the load which is carried by the cable.

The invention is applied to the portion of the cable, as shown in the Fig. 4 modification of the invention, by distorting the cable so that any tendency of the cable to straighten out will be proportional to the load placed thereon.

The numerals 7 and 8 indicate generally a record making instrument or meter which embodies a suitable casing 8 within which there is the well-known type of clock or chronometer actuated mechanism for moving a recording medium such as the paper recording strip 9. It is on this strip that the record is to be made.

The recording apparatus includes a pressure gauge with a stylus on the gauge so that the stylus inscribes or traces the line on the moving record member 9 which indicates the variation in pressure on the gauge operating the stylus.

As seen in Figs. 1 and 8 a plurality of such gauges and recordings will be made as disclosed in my parent application heretofore mentioned. Fig. 1 shows but a single recording line 10 which may be made by the gauge operated through the connection 11, while the remaining connections such as 12 are for the purpose of operating other gauges to record other operations of the apparatus.

This recording instrument 7 is also provided with a suitable time indicating means whereby a striker periodically causes an impression on the recording strip 9. Such impressions are seen at 13 in Fig. 1. The timing apparatus has not been indicated in detail here because devices of this type are old and well known.

Figs. 4, 5, and 6 show a cable tension register employed and a preferred form of this device includes a frame or bracket 14 which is supported in a suitable manner such as the cable 15. This bracket 14 carries the curved hooks 16 which form bearings or securing means for the cable 4. The cable is passed through these hooks which are spaced apart as best seen in Fig. 4.

Mounted in the bracket are two reversely arranged yieldable concave discs 18 and 19 which form a body or housing having a closed chamber or fluid holding cavity which may be filled with oil or other suitable liquid.

Between the hooks 16 the cable 4 is intended to be distorted or displaced laterally a predetermined amount by the grooved end 20 of the finger 21. This finger 21 is arranged for sliding movement through a bearing 22 in the body of the bracket 14. The inner end 23 of the finger 21 bears against the curved outer face of the disc 18 so that increased tension of the cable causes a sliding movement of the finger 21 which tends to flatten out the disc 18 and cause a compression thereof and to increase the pressure of the fluid enclosed in the chambers 18, 19. Thus when the tension on the cable 4 is increased the finger 21 tends to move inwardly as the cable tends to straighten out and to this extent the finger is yieldably supported by the disc or housing. This inward movement causes compression of the disc 18.

The disc 19 is provided with a tubular stem 25 which may be integral therewith and which is threaded through the bracket 14 so as to provide adjustments in the deflections of the cable, and has a tubular pipe or connection 26 thereon. This connection leads to the recording instrument and will be connected to the outlet 11 as seen in Fig. 1.

It is obvious that varying weights on the cable for raising and lowering the drill stem, will impart corresponding proportional weights on the cable 4 for any change in weight will then tend to change the lateral displacement of the cable between the hooks 16 and consequently cause a movement of the finger 21. Any forward movement of the finger 21 tends to compress the disc 18 and will result in a discharge of the liquid from the chamber formed by the discs 18 and 19, and a flow of this liquid 26 to the pressure gauge so as to actuate the stylus in the recorder casing 8. This variation in weight will be recorded as a line on the tape, as indicated by the line 10, upon movement of the stylus in accordance with the variations in pressure. In this manner a permanent record will be made of the weight of the suspended parts supported on the cable. Thus, knowing the suspended weight, the weight applied on the bit at the bottom of the bore hole at all times during the drilling operation is determined.

This record is very essential inasmuch as the bit at the bottom of the drill stem, if subjected to too great a load, may be crushed or otherwise injured, and the weight of the stem should at all times after the bore has attained some depth, be partly carried by the rotary or derrick so that the bit will only sustain a part of the weight of the drill stem.

An opening in the disc 19 is closed by a plug 27. This threaded passageway is useful for the introduction of fluid and by adjustment of the plug in the passageway the position of the discs may be varied slightly for purposes of adjustment.

The fluid impulses occurring in the line 26 of Fig. 4 are proportional to the variations in weight supported by the hoisting mechanism, and are transmitted through the tube 65 to the bellows 66, which is in turn connected mechanically by members 67 and 68 to the stylus 70 which is supported by a bracket 69. It will be seen that variations in pressure will affect the stylus so that such variations may be recorded on the paper 9.

Figures 2, 3:
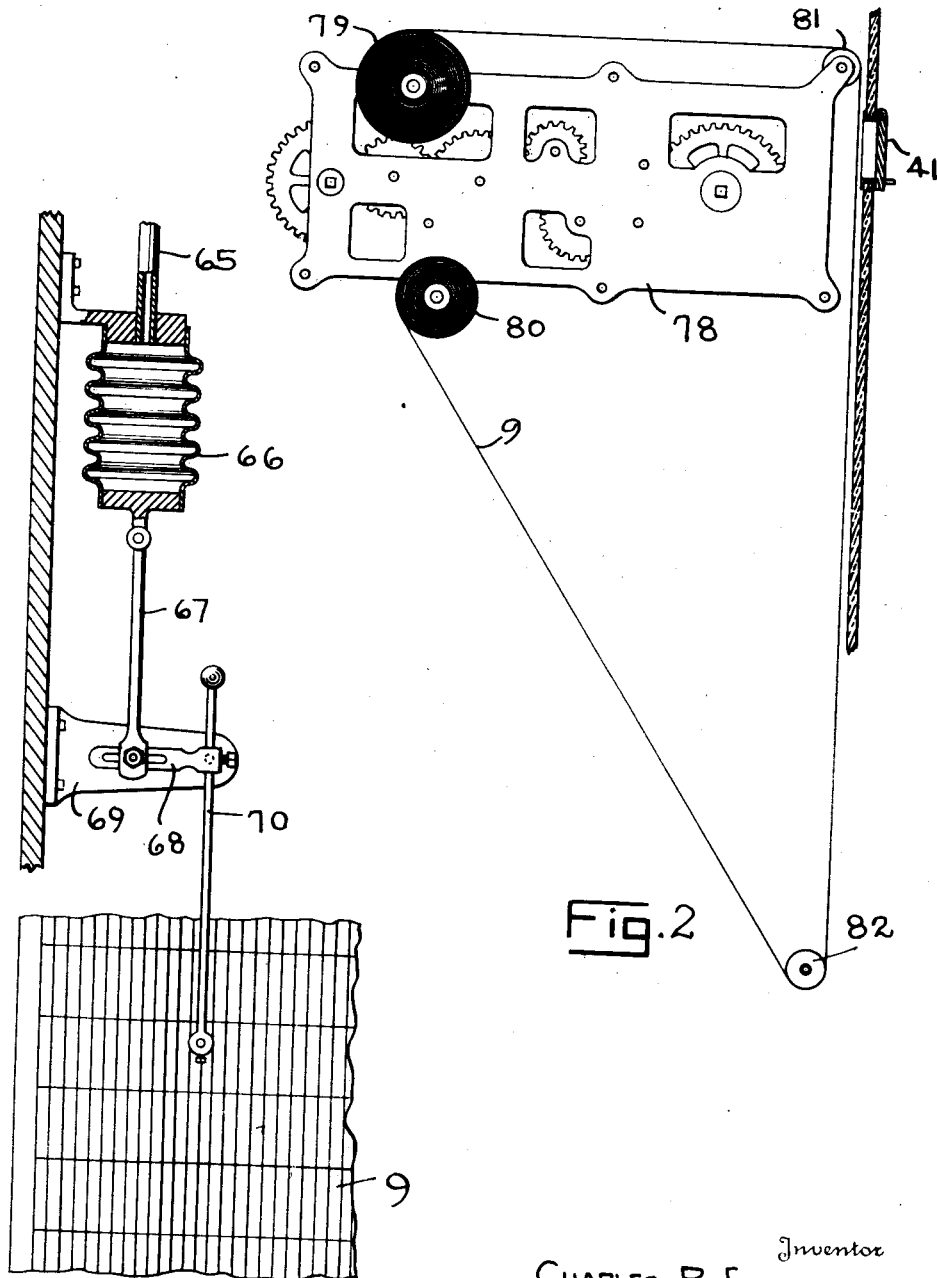
Fig. 2 shows a side view partially in section of a record tape actuator.
Fig. 3 shows a fragmentary sectional view of a fluid pressure stylus actuator.

Any conventional recording medium may be used. One form of such a device is shown in Fig. 2. A clock mechanism is indicated generally at 78, which is adapted to move the record strip 9 at a graduated and uniform rate, so that it is unreeled at 79, passed over rollers 81 and 82 and reeled up at 80. Impressions or perforations 13 on the record sheet 9 serve to correlate the data on the record with the elapse of time.

Fig. 6 shows an adjustable nut 45 positioned on the stem 25 of the diaphragm 19 so that the position of the liquid chamber with respect to the bracket 14 may be had. This adjustment may be necessary in order to accommodate different thicknesses of cable or variations in the apparatus, such as the number of lines of cable that are reeved in the traveling block to suspend the drill stem and the attached suspended load.

Fig. 7 shows a modified form of the hooks and fingers which may be used, wherein each of the hooks is provided with a roller or pulley 30 which is carried by a shaft 31 on the finger 32. This form of the invention can be used to advantage when the recorder is positioned on any part of the cable that moves as where it is reeled on and off of the draw-works, as distinguished from being fastened to the dead line as seen in Fig. 8. It is within the contemplation of the invention that it may be located within either one of these positions. These pulleys will be suitably grooved so that the cable will track in the pulleys and any change in tension will be recorded in a tendency of the cable to straighten itself between the pulleys.

Adjustments for changing the deflection of the cable or for holding the cable in different positions are also indicated in Fig. 7, where the finger 33 is slidably mounted in the frame 34 and is actuated by the cam 35. Cables 36 secure the mechanism in place.

The modification shown in Figs. 9 and 10 is substantially identical to that shown in Fig. 7 except that this form comprehends the embodiment of the device of the invention in a chain tension register. In such embodiment the outer rollers 30 are supplanted by the chain sprockets 43 and 43', over which the chain 46 passes, while idler sprocket 45 replaces the middle roller 30 and is rotatably mounted upon finger 44. In order that the sprocket 45 will be retained definitely in the plane of sprockets 43, 43' and the chain 46, the pressure responsive unit is mounted upon a fixed member 47 in the stead of a cable as shown at 36 in Fig. 7. The remaining elements of this modification are the same as the construction shown in Fig. 4 and are identified by similar primed reference characters.

Since the equipment in which it is desired to measure tension utilizes gear drives the invention may take the form of a bearing register as illustrated in Fig. 11 wherein a slidably mounted bearing as 48 will operate against the finger 44 and therefore indicate the amount of pressure exerted by the bearing, which pressure is proportional to the tension of which measurement is desired.

The recording casing 7 is provided with a transparent face 40 which in turn carries an opening 41 so that the operator may make inspection on that portion of the tape passing beneath the face 40 and opening 41. In this manner any desired remarks may be written on the tape opposite the opening 41 by the operator at the time so that a complete and permanent record may be made. If desired the entire log of the well may be written on this record.

Having described the invention, what is claimed is:—

1. Hydraulic apparatus for revealing loads which comprises a main body, a fluid-holding cavity, a member capable of limited reciprocatory movement relative thereto, means for confining the fluid in said fluid-holding cavity between said main body and said member, said means including a flexible element yieldable to transverse pressure, means for so securing a flexible element relative thereto as to produce a predetermined deflection in said flexible element, operable means adapted to shift the relative position of said member so as to change the relative degree of said movement of said member for a given load on said flexible element, and means connected to said main body for revealing the pressure upon said fluid caused by a load on said flexible element.

2. Hydraulic apparatus for revealing loads which comprises, a body, a member capable of limited reciprocatory movement relative thereto, means including a finger for so securing a flexible element relatively thereto as to produce a predetermined deflection in said flexible element, said member being in the form of a disc with which the said finger is in contact, said disc being yieldable to pressure and operable means adapted to shift the relative position to said member so as to change the relative degree of said movement of said member for a given load on said flexible element.

CHARLES R. EDWARDS.